June 14, 1960     W. R. JENSEN ET AL     2,940,556
FRICTION DEVICES
Filed Oct. 8, 1957     3 Sheets-Sheet 1
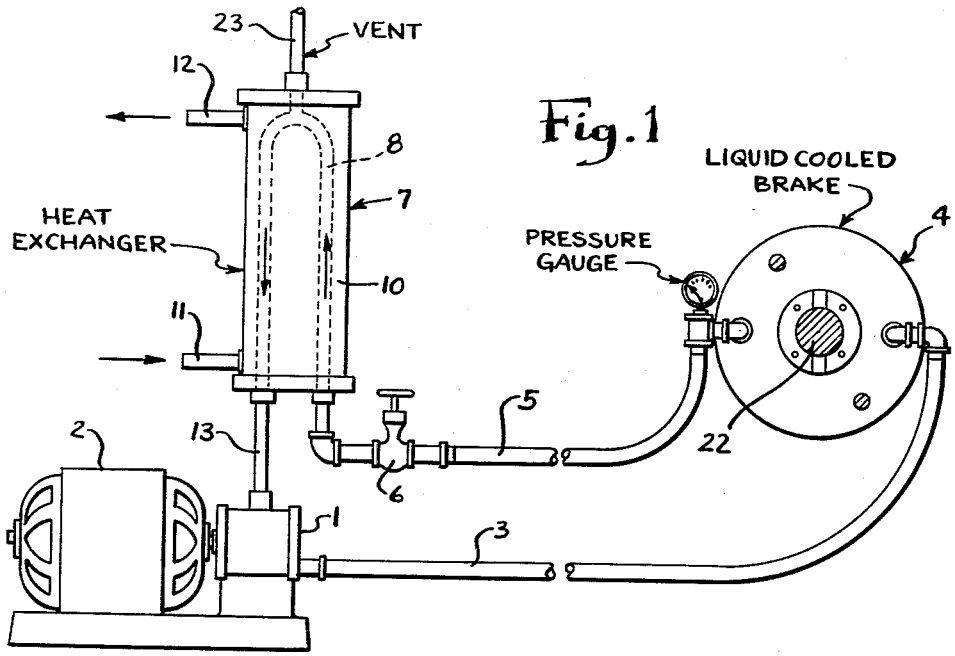
Fig. 1
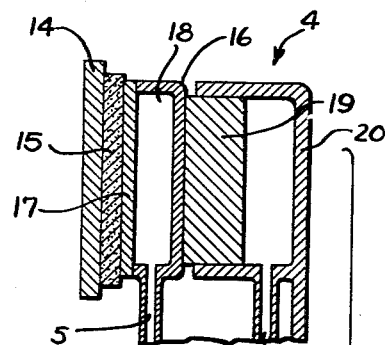
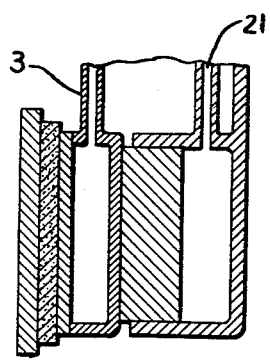
Fig. 2
INVENTORS
WARREN R. JENSEN
ARTHUR J. LACROIX, JR.
by: Gary, Desmond & Parker
ATTYS.

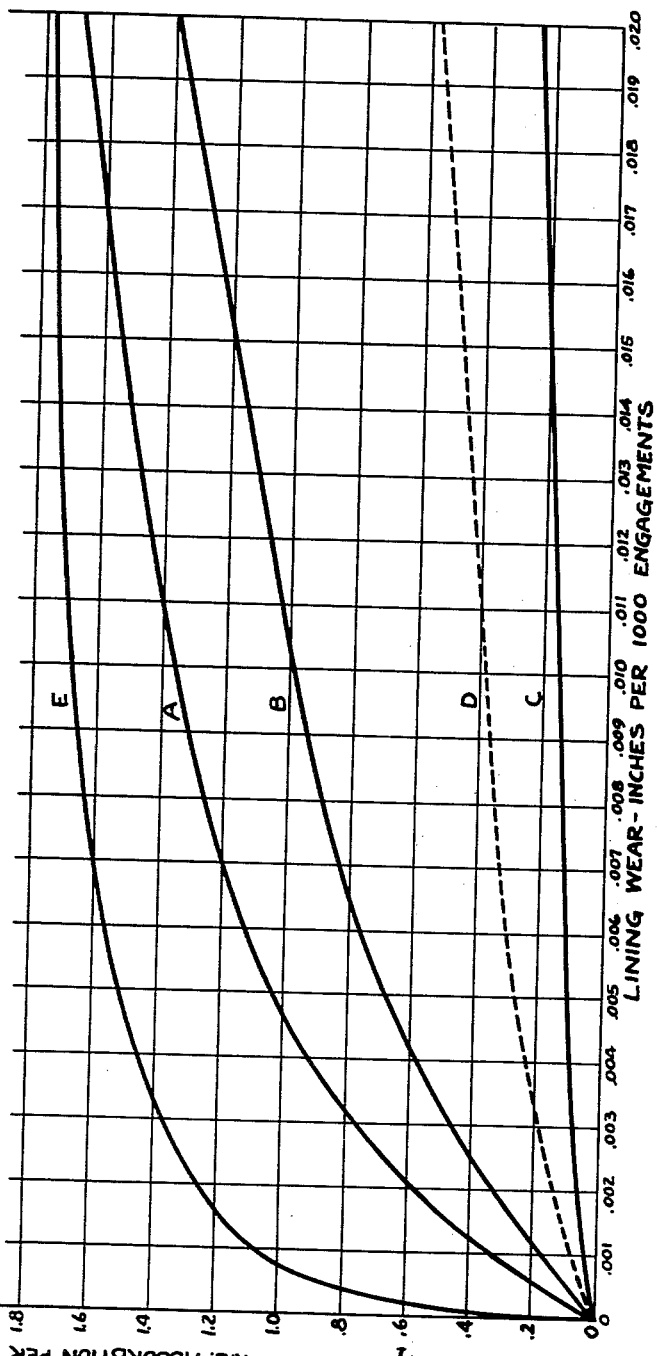

Fig. 3

BRAKE LINING WEAR VS. ENERGY ABSORBTION RATE

A - ASBESTOS FIBER REINFORCED COMPOSITION RUNNING AGAINST LIQUID COOLED COPPER.
B - ASBESTOS FIBER REINFORCED COMPOSITION RUNNING AGAINST CONVENTIONAL IRON DRUM.
C - CELLULOSE FIBER REINFORCED COMPOSITION RUNNING AGAINST CONVENTIONAL IRON DRUM.
D - EXPECTED CURVE FOR CELLULOSE FIBER REINFORCED COMPOSITION RUNNING AGAINST LIQUID COOLED COPPER.
E - ACTUAL CURVE FOR CELLULOSE FIBER REINFORCED COMPOSITION RUNNING AGAINST LIQUID COOLED COPPER, SHOWING UNEXPECTEDLY LOW WEAR.

INVENTORS
WARREN R. JENSEN
ARTHUR J. LACROIX, JR.
by Gary, Desmond & Parker
ATTYS.

United States Patent Office 2,940,556
Patented June 14, 1960

2,940,556

FRICTION DEVICES

Warren R. Jensen and Arthur J. Lacroix, Jr., Stratford, Conn., assignors to Raybestos-Manhattan, Inc., Passaic, N.J., a corporation of New Jersey Filed Oct. 8, 1957, Ser. No. 688,903

5 Claims. (Cl. 188—264)

This invention relates to friction devices designed for retarding or arresting the motion of a vehicle or mechanism with which the device is associated, generally designated as brakes, and to friction devices designed for connecting and disconnecting at will two mechanical parts adapted for transmitting torque or power from one part to the other when the parts are connected, generally designated as clutches.

The present invention is particularly concerned with the friction couples for the aforesaid devices comprising a liquid coolable metallic facing component of high heat conductive character and a fiber-reinforced, hardened, organic binder-containing friction material composition mating member of relatively low heat conductivity, and specifically with the latter component and its cooperative relationship to the former.

Thus, for example, a friction mechanism of the foregoing class in general comprises a support and a pair of elements mounted for relative rotational movement thereon and for bodily movement of one toward the other, and where a composition lining of low heat conductivity is mounted on one of said elements and the mating metallic facing component of high heat conductive character is mounted on the other and is provided with means for cooling it by circulating cooling liquid in engagement with the rear side of said metallic facing.

Such liquid cooled friction devices permit higher energy dissipations at the mating surfaces than do similar devices of equal operative surface area which are not liquid-cooled, since the use of circulating liquid coolant with metals of high heat conductivity prevents deleterious overheating of not only the metal but particularly of the composition friction material.

The friction devices may in general be of known structure such as, for example, arcuate brake shoes of the radially expanding type where the composition lining is secured to the inner face of the rotatably mounted brake drum and where the shoe facings are formed of high thermal conductivity metal, backed with a chamber adapted for circulation of cooling liquid therethrough, or, for example, disc type brakes where one or more annular discs of composition friction material are rotatably mounted on a support and adapted to be brought into surface engagement with a high heat conductive annular metal disc forming an end closure for an annular piston axially shiftable in an annular cylinder provided with means for circulating cooling liquid therethrough and in contact with the inner face of said metal disc, as more particularly illustrated, described and claimed in the copending application of Roy S. Sanford, Serial No. 427,210, filed May 3, 1954, now Patent No. 2,821,271, issued January 28, 1958.

Other examples are clutches where the driven and driving members are both rotatably mounted and are relatively axially movable for coupling, one member carrying the annular friction composition element or elements and the other comprising a liquid cooled chamber faced with an annular disc of high heat conductive metal, and retarder brakes where a liquid cooled cylinder or drum having a high thermal conductivity metal periphery is rotatably mounted on a drive shaft and is adapted to be frictionally engaged by a contracting or wrapping band lined with composition friction material, as aforesaid.

As is also known, the aforesaid devices may be brought into operative or frictional engagement, in whole or in part, by mechanical means or by pressure of the cooling liquid, with the latter at atmospheric or superatmospheric pressure, and with the aid of suitable liquid and air control valves for regulating the liquid flow and pressure.

The characterizing liquid coolable facings of the aforesaid devices are composed of metals or alloys of high thermal conductivity such as copper or silver, or their alloys or composites having a thermal conductivity of at least 40% of that of electrolytic copper and a melting point above 1500° F. Substantially pure metal such as bus bar or electrolytic copper having an average Mohs' scale hardness of 3 has been found to be eminently suitable. Also satisfactory are alloys composed primarily of copper such as a brass of 85% copper and 15% zinc content having a melting point of 1875° F. and a thermal conductivity (32°–212° F.) of 1100 B.t.u./sq. ft./hr./ ° F./in., as compared with 1980° F. and 2700 respectively for electrolytic copper of 99.9% purity. Substantially pure or fine silver which has a melting point of 1760° F. and a thermal conductivity of 2900 and a hardness substantially that of pure copper has been found suitable, as well as such of its alloys as sterling silver and coin silver. Silver plated copper friction elements are also suitable.

These metal friction facings or elements may be provided on their rear faces with reinforcing ribs. The rear faces of these elements may be formed with V-shaped concentric or spiral grooves to increase the effective area and provide more efficient heat transfer, and to the same end a wetting agent may be incorporated in the cooling liquid to insure better and more complete contacting of the metal by the liquid, the latter most suitably being aqueous.

To exemplify the use of the present invention reference will be made to the accompanying drawings which show, diagrammatically, a typical braking system embodying the friction devices of the present invention, and further graphically illustrate the advantages thereof.

In the drawings:

Fig. 1 is a diagrammatic view showing a braking system upon which the present method may be used.

Fig. 2 is a diagrammatic view of a brake shoe associated with a composition friction material whereat the heat of braking is generated and absorbed.

Fig. 3 is a graphic illustration of the wear rate of a composition brake lining plotted against energy absorption rate.

Figure 4:
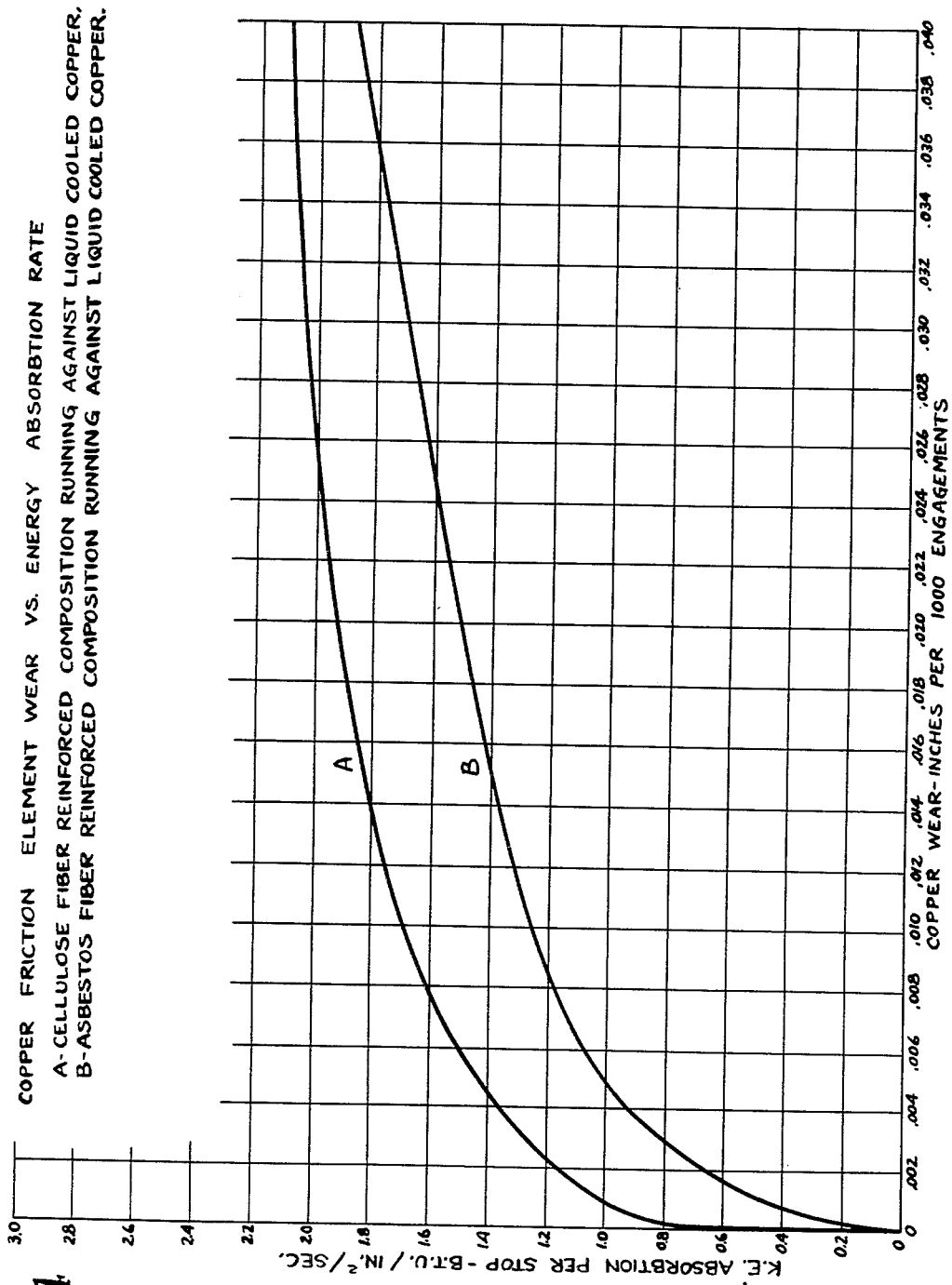
Fig. 4 is a graphic illustration of the wear rate of liquid cooled copper friction element plotted against energy absorption rate.

Referring to the drawings of Figs. 1 and 2 in detail, the reference numeral 1 indicates a pump shown as being driven by an electric motor 2. The pump is preferably a positive displacement pump and in general will have a capacity proportional to the desired energy absorption at the braking surfaces. For instance, if designed for an absorption rate of 1.0 B.t.u. per square inch per second, the desired flow rate may be calculated. The pump 1 although shown as being driven by a separate electric motor 2, may be driven by the internal combustion engine which drives the vehicle which carries the brakes to be cooled.

The outlet of pump 1 may connect into a pipe or conduit 3 which, in turn, connects into a liquid cooled brake 4 mounted on the support or axle 22. The outlet side of the brake 4 may connect into pipe 5 controlled by valve 6. On the opposite side of valve 6, said valve may connect into heat exchanger, condenser, or radiator 7, the device 7 comprising essentially a coil 8 carried within a housing 10, the housing having inlet and outlet pipes 11 and 12, respectively, which may be connected to a source of cooling liquid (not shown). The opposite end of coil 8 may be connected by pipe 13 to the inlet of pump 1. Coil 8 at its upper end may connect with a vent pipe 23 which may maintain the side of the system between valve 6 and the inlet of the pump 1 at approximately atmospheric pressure.

The heat exchanger 7 may comprise the radiator of the internal combustion engine which drives the vehicle, or the heat exchanger 7 may comprise a separate unit, the housing of which may be connected to the radiator of the internal combustion engine by pipes 11 and 12. In other words, the liquid coolant system for the brake 4 may comprise a portion of the cooling system of the internal combustion engine which drives the vehicle or said system may comprise a separate system.

In addition, the liquid coolant for the brake may comprise a portion of the hydraulic system for actuating the brakes, or the brakes may be actuated hydraulically or mechanically by separate means.

For purposes of illustration, Fig. 2 shows diagrammatically the essential working parts of the liquid cooled brake 4 of the disc type. The brake shown is of the hydraulic type, that is, wherein the members of the friction couple are urged together to make friction contact under hydraulic pressure. For purposes of simplification the hydraulic system for actuating the brake is shown as being separate from the liquid cooling system for the brake. However, in so far as the present invention is concerned it is immaterial by what actuating means the friction members are brought into pressure contact with each other.

Referring particularly to Fig. 2, 14 comprises a moving portion of the device which carries the brakes, such as the wheel of an automotive or aircraft vehicle. A fiber-reinforced, hardened organic binder-containing friction element of low heat conductivity in the form of an annular disc or ring 15, is secured to the rotating member 14 by any conventional means such as by adhesive, rivets or the like.

In juxtaposition with respect to the composition friction ring 15 is a brake shoe 16. The brake shoe is annular in shape and comprises a liquid coolable, metallic friction element facing component 17 of the class hereinbefore described which, when the brake is applied, makes surface contact with the outer face of the ring 15. The brake shoe is of hollow construction, having an annular liquid compartment 18 through which a liquid coolant is adapted to circulate, the liquid being introduced through inlet pipe 3 and discharged through outlet pipe 5.

For purposes of application the brake 4 may also comprise an annular piston 19 which slidably moves in an annular cylinder 20. The brake shoe 16 and cylinder 20 comprises a stationary portion of the vehicle and fluid pressure may be established in the cylinder 20 by the introduction of fluid under pressure thereinto through pipes 21, which later may be connected to a control cylinder or controlled source of fluid under pressure (not shown), for applying the brakes.

As will be noted, unlike conventional braking systems wherein composition friction material is carried by the brake shoe and coacts with a metal brake drum or disc, the brake shoe in the instant system has a metallic friction element or plate 17 which has relatively high heat conductive properties. Thus, heat generated at the contact surfaces of the mating members 15 and 17 is readily conducted through the thickness of the member 17 and transferred to the liquid coolant circulated through the space 18.

The friction composition materials employed in the present invention, such as the element 15, are essentially composed of fiber-reinforced hardened organic binder compositions. These desirably include fillers which may be organic or inorganic particles and which may be of friction augmenting or modifying character or purely inert materials. These binders are generally thermosetting resins such as the conventional or oil modified phenol-aldehyde resins, epoxy resins, or polyester resins; drying oils; vulcanizable natural or synthetic rubbers; or mixtures of the foregoing, all of which are converted to a hardened condition by or with the aid of heat.

The friction fillers may be relatively inert materials such as barytes which has a Mohs' scale hardness of about 3, clay or talc; lubricants such as graphite, litharge, lead particles or sulfur; organic friction augmenting or enhancing agents such as prevulcanized rubber or cardolite particles, the latter being a formaldehyde reaction product of cashew nut shell liquid, a phenolic material; and inorganic friction agents such as rottenstone which has a hardness of 3–4, iron oxide which has a hardness of about 4.5–5.5, and pyrites which has a hardness of about 6.

The reinforcing fibers conventionally employed for composition friction materials of the class described are principally asbestos which has a hardness of about 5, although at times minor amounts of cellulose fibers are also added primarily for their friction augmenting or modifying character in use. Such asbestos fiber-reinforced composition friction materials employed as friction linings with previously conventional air-cooled steel or iron drums can be used on motor vehicles such as busses, trucks, passenger cars, and the like moderate energy equipment at average energy loadings of about 1 B.t.u. per square inch per second as a maximum, and with commercially acceptable average life of the composition linings of the order of 25,000 miles. With high energy vehicles such as aircraft where average energy absorption requirements may reach the order of 3–5 B.t.u. per square inch per second, 100 stops was considered as acceptable lining life. Using the same asbestos fiber-reinforced linings with liquid cooled brakes of the class herein described for such aircraft it was found that the life of the lining lasted at least 1000 stops.

In attempting to employ the same asbestos fiber-reinforced linings with the liquid cooled brakes of the aforesaid lower or moderate energy vehicles it was unexpectedly found that this same ratio of 10 times increase in wear rate did not hold, but on the contrary both the high heat conductive metal facing of the liquid cooled brake and the asbestos-fiber-reinforced lining began to wear at a rate commercially or economically unfavorable, as appears from the accompanying drawing graphically illustrating the wear versus energy absorption rate for various linings against various mating members.

Fig. 3 of the drawing illustrates the rate of wear of fiber-reinforced brake linings per 1000 engagements plotted against kinetic energy absorption per stop in B.t.u. per square inch per second, based on a series of tests for the purpose of comparing conventional brakes with liquid cooled brakes, and composition brake linings of different fiber-reinforcement.

The brake linings tested were composed of compositions containing approximately 20% of reinforcing fibers, 42% thermoset organic binder, and the balance fillers, all by volume. In one composition the fibers were all asbestos and in the other all cellulose.

The tests were based on the use of a lining of 50 square inches with a wheel inertia load of 2200 pounds with a flywheel operating at velocity equivalents of 50 miles per hour and upwards, and a deceleration rate of 15 feet per second, per second.

Curve A, plotted from test data employing the asbestos-fiber-reinforced lining above described with an electrolytic copper-faced water-cooled shoe, indicates that the improvement over the wear rate of the same lining running against a conventional iron drum was not as great as is economically desirable, as shown in curve B. On the other hand, with all-cellulose lining faced shoes running against conventional air-cooled iron brake drums the wear increased exponentially as shown in curve C.

From these it might have been expected that the use of such apparently combustible cellulose fiber-reinforced composition lining with a copper-faced water-cooled shoe would result in a curve D lying intermediate curves A or B and C, but unexpectedly the test results showed a new order of low wear rate of cellulose lining with the liquid cooled shoes, which is considered to be a difference in kind at average energy absorption rates up to about 1.5–2.00 B.t.u. per square inch per second. At the same time the life of the copper was preserved and the wear appreciably decreased.

Comparative tests of friction linings of all-cellulose fiber reinforcement versus all-asbestos fiber reinforcement composition as aforesaid, in disc type brakes of 50 square inch effective area employing bus bar copper faced shoes cooled on the opposed face with water pumped at the rate of 25 gallons per minute, were made as follows: A flywheel was loaded at 2200 pounds, and the brake run in for 100 stops at 480 revolutions per minute, equivalent to a velocity of 40 miles per hour, and then for an additional 100 stops at a speed of 600 revolutions per minute, equivalent to a velocity of 50 miles per hour or until 100% contact was achieved. The brake is then dismantled and measurements taken on 4 spots on the copper element and 12 on the composition lining. The brake is then reassembled, run at 600 revolutions per minute for 500 engagements with 15 feet per second per second decelerations at 2-minute intervals, followed by dismantling and measuring of wear as previously.

The average wear per 1000 engagements was found to be .0007 inch for each of both the copper element and the cellulose base lining as compared to .0044 inch for the element and asbestos base lining combination. The kinetic energy in each case was 184,000 foot pounds and thus equivalent to an energy absorption of approximately 0.97 B.t.u./in.²/sec., and the wear rate when using the cellulose base lining showed an approximate 400% advantage.

A similar test of the wear rate of the cellulose fiber base lining and copper faced, water cooled shoe at substantially twice the foregoing energy absorption, i.e., at a kinetic energy total of 362,000 foot pounds, at a velocity equivalent to 70 miles per hour, equivalent to an energy absorption of approximately 1.4 B.t.u./in.²/sec., showed a wear of .0034 inch for the cellulose base lining and .0045 inch for the copper element, as compared to wear rates of .016 inch for asbestos base lining and .013 inch for the liquid cooled copper element combination under the same conditions of energy absorption.

Another similar test at a kinetic energy total of 600,000 foot pounds at a velocity equivalent to 90 miles per hour, equivalent to an energy absorption of approximately 1.75 B.t.u./in.²/sec., showed a wear of .015 inch for the cellulose fiber base lining and 0.12 inch for the liquid cooled copper element, as compared to wear rates of .022 inch for asbestos fiber base lining and .032 inch for the liquid cooled copper element under the same conditions of energy absorption.

Fig. 4 similarly illustrates the rate of wear of a liquid cooled copper friction element per 1000 engagements plotted against kinetic energy absorption per stop in B.t.u. per square inch per second, based on the foregoing series of tests. In this figure, both curves B and A were respectively based on data derived from use of liquid cooled copper friction element components, in combination with the wholly asbestos fiber reinforced lining composition and the wholly cellulose fiber reinforced lining composition, showing the high magnitude of improved copper wear rate in the energy ranges and field of use contemplated herein and that the improved lining wear rate of the comparable curves in Fig. 3 was not obtained at the expense of excessive wear of the copper.

The fact that the cellulose lining wears the copper only slightly while at the same time standing up well itself is the key to long life of the friction couple herein described in the indicated moderate energy range.

The following is an example of a typical fiber-reinforced hardened organic binder friction material composition employed in the specific examples and for the plotting of curves in the accompanying graphic illustration, the fibers in one case being wholly of short fiber asbestos, and in the other wholly cellulose such as cotton floc, bleached sulfite pulp cotton linters, or regenerated cellulose woven or unwoven fibers or mixtures of such fibers, the percentages being given by volume since the distribution and exposed area of the particles employed in the friction track are of greater influence than are their respective weights.

Example I

| | Percent | |
|---|---|---|
| Fibers | | 20.52 |
| Binder: | | |
|   Oil modified phenolic resin | 21.40 | |
|   Phenolic resin | 7.70 | 42.47 |
|   Rubber latex solids | 10.33 | |
|   Sulfur | 3.04 | |
| Fillers: | | |
|   20-mesh cardolite | 11.38 | |
|   Graphite | 7.56 | |
|   Barytes powder | 5.46 | 37.01 |
|   325-mesh 18% lead litharge | 6.80 | |
|   40-mesh pyrites | 4.71 | |
|   Plasticizer | 1.10 | |
| | | 100.00 |

The following examples further illustrate suitable compositions of the fiber reinforced friction element of the present invention:

Example II

| | Percent | |
|---|---|---|
| Fibers: | | |
|   Cotton linters | | 10.52 |
| Binder: | | |
|   Phenol resin | 10.4 | |
|   Resin accelerator | 1.19 | |
|   Rubber | 10.1 | 40.29 |
|   Sulfur | 3.5 | |
|   Liquid cashew nut shell resin | 15.1 | |
| Fillers: | | |
|   Carbon black | 5.05 | |
|   Barytes | 5.23 | |
|   Talc | 10.31 | 49.19 |
|   Litharge | 8.76 | |
|   Rottenstone | 7.53 | |
|   Rubber tire waste | 12.31 | |
| | | 100.00 |

Example III

| | Percent | |
|---|---|---|
| Fibers: | | |
|   Sufite pulp | 29.51 | 39.19 |
|   Asbestos fiber | 9.68 | |
| Binder: | | |
|   Phenol resin | 25.26 | |
|   Liquid cardolite resin | 7.64 | 48.16 |
|   Latex rubber solids | 11.55 | |
|   Sulfur | 3.71 | |
| Fillers: | | |
|   Flake graphite | 4.30 | |
|   100-mesh lead powder | 5.21 | 12.65 |
|   Talc | 3.14 | |
| | | 100.00 |

The foregoing compositions are converted to strips or sheets of desired thickness and density by various methods known in the friction material art. For example, all of the components are mixed dry except the latex, and with the aid of the latex further mixed to give a plastic mass which is then extruded into strips, following which the strips are cut to desired size and the pieces placed in a hot press for about 15 minutes at a temperature of 325° F. to cure the resin and to vulcanize the rubber.

Although it is preferable to have all of the reinforcing fibers cellulose for the purpose of the present invention and that the average hardness of the composition be not appreciably greater than the liquid-coolable metallic facing, from about 0% to about 10% by volume of the composition may be of filler particles harder than the metallic facing, and to this extent any asbestos fiber content may be considered to be a friction modifying filler and is approximately the limit of asbestos fibers that can be tolerated without undue wear of the said metal friction element as contemplated by the present invention.

The fiber content should be at least about 10% by volume to provide necessary strength, but not in excess of about 40% by volume, since excess results in undue wear, and these fibers should be at least 75% by volume organic fibers such as cotton or wood pulp.

Although the composition element may be composed of 40% of fibers and 60% binder by volume, the use of at least 10% by volume of fillers is desirable for improvement of wear and may be as high as about 60% by volume. The binder solids should be at least equal to the fiber in volume.

The ability to use cellulose as the sole or principal fiber reinforcement in the aforesaid composition friction material and the elimination therefrom of any appreciable amount of materials harder than that of the liquid cooled metallic facing has permitted the use of the described metals of high heat conductivity, which are of course softer than the previously conventional iron and steel drums or discs, with a minimum amount of wear to either the composition or metallic components of the friction couple. Conversely, the ability to rapidly draw heat away from the friction couple interface and to thereby maintain relatively low temperatures thereat, particularly at average energy loadings of up to about 2 B.t.u. per square inch per second, has made it possible to employ cellulose fibers as the essential or sole reinforcing fiber component. Under such conditions hot strength is not a factor and the liquid cooling under these moderate energy conditions is entirely adequate, since the cellulose carbonization temperature in the unit is above 400° F.

This has not only made it possible to provide friction couples of long component and assembly life, but has also permitted the reduction in brake area where this is a factor and has also permitted the doubling of the heat absorption rate capability without increase of brake area when compared to previously conventional asbestos base linings employed with non-liquid cooled iron or steel mating members, all with comparable or even enhanced wear life.

We claim:
1. In a brake mechanism having a support and a pair of brake elements mounted for relatively rotational movement thereon, the combination of a substantially nonmetallic heat-insulating friction composition brake lining of relatively low heat conductivity on one of the elements, a metallic friction facing composed primarily of relatively high heat conductive metal selected from the group consisting of silver, copper and alloys of said metal having a melting point of at least 1500° F. and a thermal conductivity of at least 40% of that of pure electrolytic copper on the other of said elements having one surface positioned for frictional engagement with the surface of said lining, means for maintaining a circulating cooling liquid in engagement with the surface of said copper facing directly opposite said one surface, and means for bodily moving one of said elements toward the other to effect direct physical engagement of said one surface of the copper with the surface of the brake lining, said composition friction material liner being composed of hardened organic binder, fiber reinforcement and friction material filler, not more than 10% by volume of said liner components being harder than said metallic friction element.

2. The mechanism of claim 1 wherein the fiber content of the friction composition liner is from about 10% to about 40% by volume and at least 75% thereof is composed of organic fibers.

3. The mechanism of claim 1 wherein the fiber content of the friction composition liner is from about 10% to about 40% by volume of which from about 75% to about 100% is cellulose.

4. The mechanism of claim 1 wherein the metallic friction facing is composed of copper and wherein the fiber of friction composition liner is cellulose.

5. The mechanism of claim 1 wherein the friction composition liner has a low wear rate substantially equal to that of said metal facing at energy absorptions up to about 1.5–2.00 B.t.u. per square inch per second.

References Cited in the file of this patent

UNITED STATES PATENTS

| | | |
|---|---|---|
| 464,949 | Alden | Dec. 15, 1891 |
| 909,617 | Laeufer et al. | Jan. 12, 1909 |
| 1,855,636 | Ketchum | Apr. 26, 1932 |
| 2,128,635 | Church et al. | Aug. 30, 1938 |
| 2,152,489 | Lamb | Mar. 28, 1939 |
| 2,258,237 | Bockius et al. | Oct. 7, 1941 |
| 2,382,570 | Kraft | Aug. 14, 1945 |
| 2,428,299 | Spokes et al. | Sept. 30, 1947 |
| 2,686,140 | De Gaugue | Aug. 10, 1954 |
| 2,702,770 | Steck | Feb. 22, 1955 |
| 2,861,964 | De Gaugue | Nov. 25, 1958 |

FOREIGN PATENTS

| | | |
|---|---|---|
| 915,038 | France | July 8, 1946 |
| 191,917 | Germany | Mar. 25, 1906 |